(12) United States Patent
Akikuni et al.

(10) Patent No.: US 6,560,003 B2
(45) Date of Patent: May 6, 2003

(54) LIGHT RECEIVING MODULE AND LIGHT RECEIVING METHOD WITH REDUCED POLARIZATION DEPENDENCE

(75) Inventors: Fumio Akikuni, Kanagawa (JP); Katsushi Ohta, Kanagawa (JP)

(73) Assignee: Ando Electric Co., Ltd., Kanagawa (JP)

( * ) Notice: Subject to any disclaimer, the term of this patent is extended or adjusted under 35 U.S.C. 154(b) by 228 days.

(21) Appl. No.: 09/816,916

(22) Filed: Mar. 23, 2001

(65) Prior Publication Data

US 2001/0024331 A1 Sep. 27, 2001

(30) Foreign Application Priority Data

Mar. 24, 2000 (JP) ........................................ 2000-085432

(51) Int. Cl.[7] .............................. G02F 1/01; G02F 1/03; G02B 6/32
(52) U.S. Cl. .......................... 359/249; 359/246; 385/34
(58) Field of Search ................................. 359/249, 246, 359/251, 484, 485, 495, 496, 497, 324, 281, 487, 499, 152; 372/73, 33, 6; 385/33, 34, 35, 36, 11, 74

(56) References Cited

U.S. PATENT DOCUMENTS

| 5,276,747 A | * | 1/1994 | Pan | 250/225 |
| 5,440,117 A |   | 8/1995 | Garrett et al. | 250/225 |
| 5,552,918 A |   | 9/1996 | Krug et al. | 359/152 |
| 5,604,636 A |   | 2/1997 | Asami et al. | 359/637 |
| 5,805,749 A | * | 9/1998 | Sato | 359/152 |
| 5,825,950 A | * | 10/1998 | Cheng | 385/34 |
| 6,040,934 A | * | 3/2000 | Ogusu et al. | 385/27 |
| 6,373,569 B1 | * | 4/2002 | Herman et al. | 385/34 |
| 6,410,906 B1 | * | 6/2002 | Ito et al. | 385/27 |
| 6,421,176 B1 | * | 7/2002 | Takahashi et al. | 353/33 |

FOREIGN PATENT DOCUMENTS

JP  7-318766  12/1995

OTHER PUBLICATIONS

Gerthsen, *Physik, Ein Lehrbuch zum Gebrauch neb en Vorlesungen*, Springer Verlag, Berlin, 1958, p. 399 (Section 20.3)—p. 408.

* cited by examiner

Primary Examiner—Hung Xuan Dang
Assistant Examiner—Omar Hindi
(74) Attorney, Agent, or Firm—Fish & Richardson P.C.

(57) ABSTRACT

A light receiving module and a light receiving method to reduce polarization dependence, used in evaluation of polarization characteristics of various optical parts. The light receiving module has an optical mechanism including a first light transmission plate and a second light transmission plate between a first lens and a second lens, and a light receiving element of the outside of the optical mechanism. The first light transmission plate is inclined at such an angle as to have the same value as polarization dependence due to the inclination of the light receiving surface of the light receiving element, and subsequently the first light transmission plate is rotated by 90° in relation to the optical axis.

6 Claims, 2 Drawing Sheets

LIGHT RECEIVING MODULE AND LIGHT RECEIVING METHOD WITH REDUCED POLARIZATION DEPENDENCE

BACKGROUND OF THE INVENTION

1. Field of the Invention

The present invention relates to a light receiving module and a light receiving method with reduced polarization dependence, and particularly to a light receiving module and a light receiving method with reduced polarization dependence used in evaluation of polarization characteristics of various optical parts.

2. Description of the Related Art

It has been desired to reduce the amount of change (hereinafter called "polarization dependence") in light output detected by a light receiving element in a light receiving module used in evaluation of polarization characteristics of various optical parts. A related art for reducing this polarization dependence is disclosed in, for example, JP-A-7-318766. The related art will be described in detail below.

FIG. 3 is a schematic configuration diagram of a light receiving module in the related art.

In FIG. 3, incident light 21a emitted from an optical fiber 21 is focused through a first lens 22 and passes through an light transmission plate 24 and is focused through a second lens 26 and is received by a light receiving element 23. This light receiving element 23 includes a glass plate 23a and a light receiving surface 23b.

Incidentally, an evaluation apparatus (not shown) of polarization characteristics measures a light output of the incident light 21a emitted from the optical fiber 21 to evaluate the polarization characteristics by analyzing an electrical signal into which the incident light 21a is converted by the light receiving element 23.

The light receiving module in this related art will be described in further detail.

In FIG. 3, the first lens 22, the second lens 26, and the light receiving surface 23b of the light receiving element 23 are inclined at a several angle with respect to an optical axis of the incident light 21a to receive the incident light 21a, respectively.

In this case, when light reflected by the first lens 22, the second lens 26 and the light receiving surface 23b returns to the side of a light source 27, for example, in laser light, characteristics of the side of the light source 27 deteriorate, so that a precise light outout cannot be measured.

Next, even in case that the light output of the incident light 21a does not change, when the light output is measured with high precision (requiring a precision of the order of 3/1000 dB), a polarization state of the incident light 21a or a change in wavelength cannot be ignored.

Due to inclinations of the first lens 22, the second lens 26 and the light receiving element 23 with respect to the optical axis of the incident light 21a, a difference in the quantity of transmission light depending on a polarization state of the incident light 21a occurs in the light receiving surface 23b of the light receiving element 23 in which a difference in a refractive index occurs.

Incidentally, the quantity of transmission light is quantity of light obtained by subtracting quantity of reflected light from total quantity of light of the incident light 21a and is the quantity of light detected in the light receiving element.

Also, even in case that the light output is constant incident light 21a, there is a problem (polarization dependence) in that the light output finally detected in the light receiving element 23 varies with a change in the polarization state (for example, a change from linear polarization to circular polarization).

In order to solve the polarization dependence or each of the problems, in this related art, the light transmission plate 24 is placed adjacent to the light receiving surface 23b of the light receiving element 23 and is inclined with respect to the optical axis of the incident light 21a and is inclined at such an angle that polarization dependence due to the inclination of the light receiving surface 23b of the light receiving element 23 has the same value as polarization dependence occurring due to the inclination of the light transmission plate 24, and an inclined direction of the light transmission plate 24 is held at a 90° twisted position relation with respect to an inclined direction of the light receiving surface 23b of the light receiving element 23.

However, there is an influence due to variations during assembly such as an angle deviation of lens holding parts (not shown) used in the light receiving module or an inclination angle deviation in adjusting the optical axis, so that there is a problem in that the polarization dependence cannot fully be canceled even when using the related art described above.

The invention is implemented in view of the problem, and an object of the invention is to provide a light receiving method and a light receiving module for reducing polarization dependence occurring in the case of inclining a light receiving element at an arbitrary angle with respect to an optical axis of incident light and for being resistant to influence of a change in a polarization state of the incident light.

SUMMARY OF THE INVENTION

A light receiving module with reduced polarization dependence according to the invention can solve the problem by the following description and achieve the object of the invention.

1. There is provided a light receiving module with reduced polarization dependence comprising:
   a first lens;
   a second lens;
   a first light transmission plate disposed between the first lens and the second lens;
   a second light transmission plate disposed between the first lens and the first light transmission plate; and
   a light receiving element having a light receiving surface, the light receiving element disposed adjacent to the first light transmission plate with the second lens sandwiched;
   wherein the light receiving element is disposed so that the light receiving surface is not perpendicular to an optical axis of an incident light beam;
   the first optical transmission plate is disposed so that a polarization dependence of the first optical transmission plate is equal to a polarization dependence of the light receiving surface, and the first optical transmission plate is rotated by 90° with respect to the optical axis; and
   the second optical transmission plate is disposed so that the sum of a polarization dependence of the second optical transmission plate and the polarization dependence of the first transmission plate is equal to the polarization dependence of the light receiving surface to cancel out the remaining polarization dependence, and the second optical transmission plate is rotated by 90° with respect to the optical axis.

2. At least one of the first light transmission plate and the second light transmission plate is a parallel plane plate.

3. At least one of the first light transmission plate and the second light transmission plate is a wedge plate.

Also, a light receiving method with reduced polarization dependence according to the invention can solve the problem by the following description and achieve the object of the invention.

4. A light receiving method with reduced polarization dependence, comprising the steps of:

disposing a first lens;

disposing a second lens;

disposing a first light transmission plate between the first lens and the second lens;

disposing a second light transmission plate between the first lens and the first light transmission plate;

disposing a light receiving element having a light receiving surface, adjacent to the first light transmission plate with the second lens sandwiched so that the light receiving surface is not perpendicular to an optical axis of an incident light beam;

inclining the first optical transmission plate so that a polarization dependence of the first optical transmission plate is equal to a polarization dependence of the light receiving surface;

rotating the first optical transmission plate by 90° with respect to the optical axis;

inclining the second optical transmission plate so that the sum of a polarization dependence of the second optical transmission plate and the polarization dependence of the first transmission plate is equal to the polarization dependence of the light receiving surface to cancel out the remaining polarization dependence; and rotating the second optical transmission plate by 90° with respect to the optical axis.

5. At least one of the first light transmission plate and the second light transmission plate is a parallel plane plate.

6. At least one of the first light transmission plate and the second light transmission plate is a wedge plate.

DETAILED DESCRIPTION OF THE PREFERRED EMBODIMENTS

An example of embodiments of a light receiving module and a light receiving method with reduced polarization dependence according to the invention will be described in detail with reference to the accompanying drawings below.

First Embodiment

Figure 1:
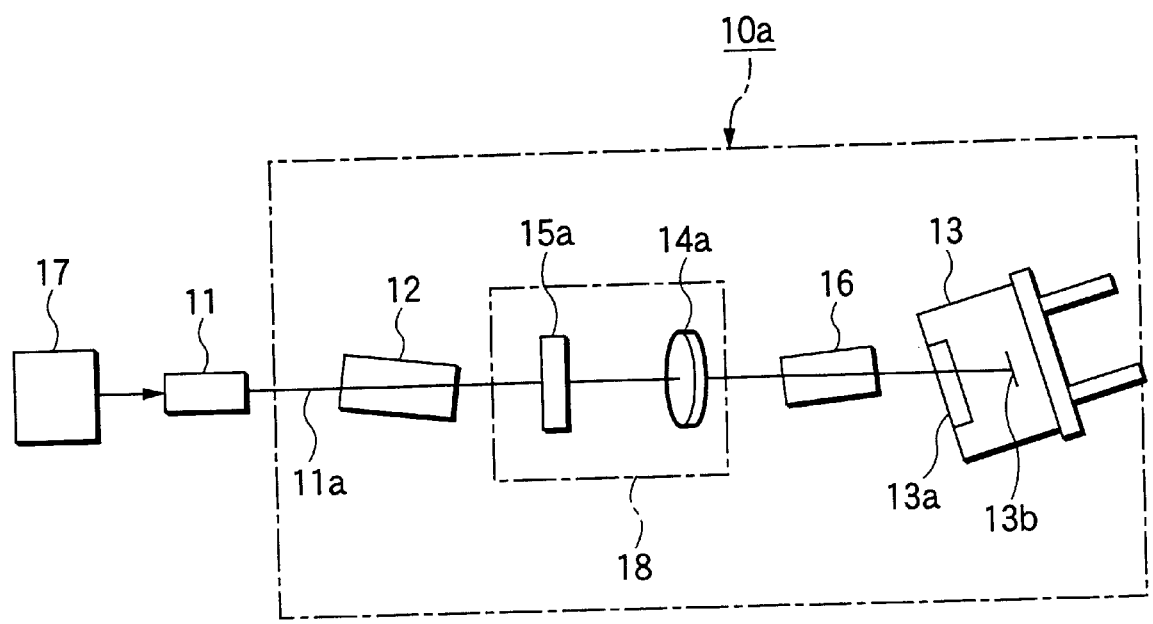
FIG. 1 is a schematic configuration view of a light receiving module according to a first embodiment of the invention.

FIG. 1 is a schematic configuration diagram of a light receiving module and a light receiving method with reduced polarization dependence according to a first embodiment of the invention.

In FIG. 1, a light receiving module 10a of the first embodiment has an optical mechanism 18 including a first parallel plane plate (light transmission plate) 14a and a second parallel plane plate (light transmission plate) 15a between a first lens 12 and a second lens 16, and a light receiving element 13 of the outside of the optical mechanism 18.

The light receiving element 13 is placed adjacent to the first light transmission plate 14a with the second lens 16 sandwiched, and comprises a glass plate 13a and a light receiving surface 13b.

Light emitted from a light source 17 passes through an optical fiber 11 and enters the light receiving module 10a as incident light 11a.

Then, this light passes through the first lens 12, the second parallel plane plate 15a, the first parallel plane plate 14a and the second lens 16 and thereafter, enters the light receiving element 13.

Incidentally, a transparent member such as glass (light transmission plate) is used as these parallel plane plates.

The light receiving element 13 is inclined at a several angle with respect to an optical axis of the incident light 11a in order to prevent reflected light at the light receiving surface 13b from returning to the side of the light source 17.

However, polarization dependence occurs due to an inclined angle, namely an angle of incidence of the incident light 11a, and a difference between air and the light receiving element 13 in a refractive index, so that each of the members constructing the light receiving module 10a of the embodiment is placed by the following method.

The first parallel plane plate 14a and the second parallel plane plate 15a, both constructing the optical mechanism 18, are inclined so that the sum of a polarization dependence of the first parallel plane slate 14a and a polarization dependence of the second parallel plane plate 15a is equal to a value of the polarization dependence occurring in the light receiving element 13, and the first parallel plane plate 14a is mounted so as to have a 90° twisted position relation with respect to an inclined direction of the light receiving surface 13b. In theory, the polarization dependence of the light receiving surface 13b can be canceled out by using only the first transmission plate 14a. However, when the optical mechanism 18 is manufactured in practice, the polarization dependence of the light receiving surface 13b cannot be canceled out by using only the first transmission plate 14a. Because there remains a polarization dependence due to influence of an angle deviation of lens holding parts or an inclination angle deviation in adjusting the optical axis. Therefore, the second transmission plate 15a is required to cancel out the remaining polarization dependence.

Also, the second parallel plane plate 15a is mounted so as to have a 90° twisted position relation with respect to an inclined direction of the first parallel plane plate 14a.

Also, polarization dependence due to influence such as an angle deviation of lens holding parts or an inclination angle deviation in adjusting the optical axis is adjusted by placing the second parallel plane plate 15a.

In tie embodiment, the polarization dependence can fully be canceled by the configuration described above.

Second Embodiment

Figure 2:
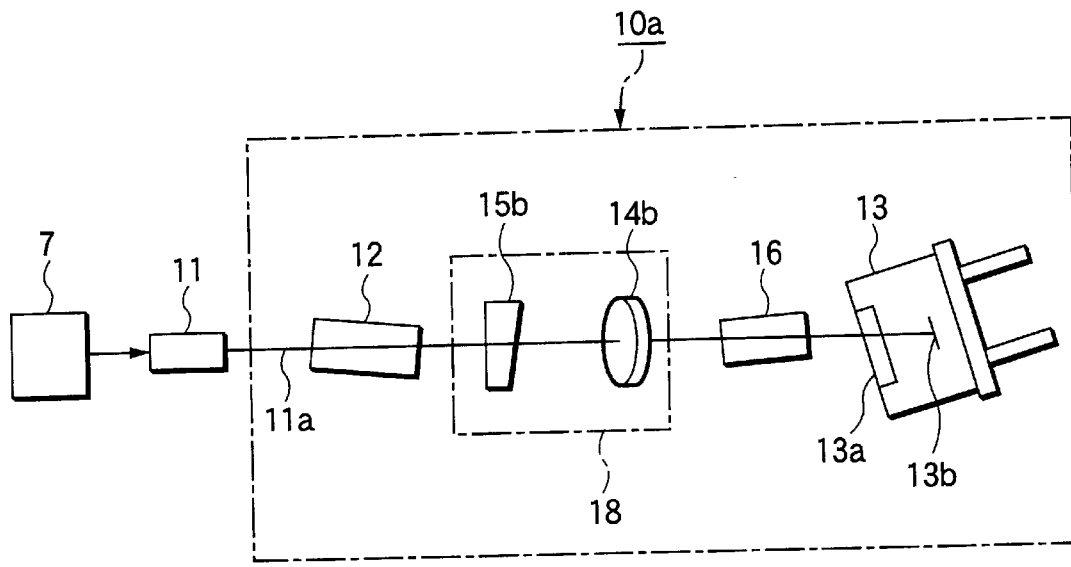
FIG. 2 is a schematic configuration view of a light receiving module according to a second embodiment of the invention.
Figure 3:
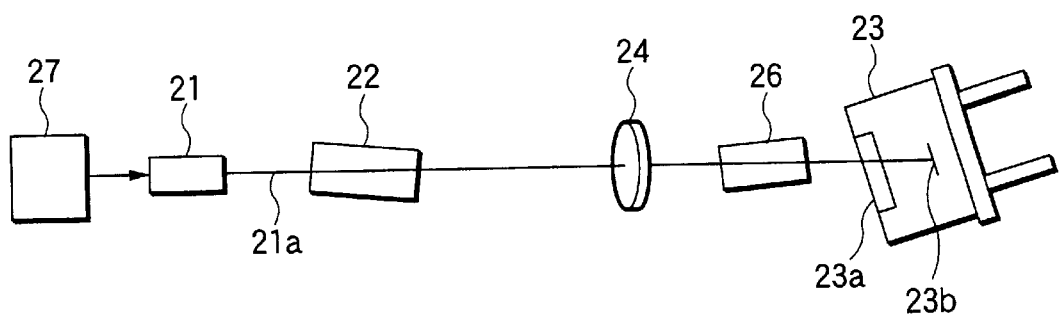
FIG. 3 is a schematic configuration view of a light receiving module in a related art.

FIG. 2 is a schematic configuration diagram of a light receiving module and a light receiving method with reduced polarization dependence according to a second embodiment of the invention.

In a light receiving module 10b of this embodiment, the parallel plane plates 14a and 15a are replaced with wedge plates 14b and 15b, and the other configurations are the same.

In the case of using the parallel plane plates 14a and 15a as the first embodiment, interference occurs when coherence of the incident light 11a is high.

This interference occurs due to multiple reflections between these two planes 14a and 15a when parallel light passes through the parallel plane plates 14a and 15a, and a periodical variation is caused in relation to changes in a wavelength of the incident light 11a or a plate thickness of the parallel plane plates 14a and 15a.

That is, under conditions that the interference has occurred, a detection light output varies due to the change in the wavelength even when the polarization dependence is canceled.

This embodiment is a method of using a wedge plate in order to prevent the interference occurring in the case of using such parallel plane plates.

The wedge plate used in this embodiment is a wedge-shaped glass plate with a surface of one side having an angle with respect to a surface of the other side. Resonance at a specific wavelength is suppressed by a continuous change in a plate thickness while forcedly relieving multiple reflection light within the plates with respect to the optical axis. The interference is prevented by averaging variations in the quantity of transmission light.

Thus, in this embodiment, even when the coherence of the incident light 11a is high, the light receiving module which is not dependent on the changes in the wavelength of the incident light 11a or the polarization state can be obtained.

Incidentally, a configuration in which either the parallel plane plate 14a or 15a is replaced with the wedge plate may be used.

As described in detail above, in accordance with a light receiving module and a light receiving method with reduced polarization dependence according to the invention, an optical mechanism is placed with a first light transmission plate inclined at such an angle as to have the same value as polarization dependence due to the inclination of a light receiving surface of a light receiving element and the first light transmission plate held at a 90° twisted position relation with respect to an inclined direction of the light receiving surface of the light receiving element and a second light transmission plate inclined at a 90° twisted position relation with respect to the first light transmission plate and it is constructed so as to incline and hold the first light transmission plate and the second light transmission plate at such an angle that polarization dependence due to the inclination of the first light transmission plate and the inclination of the light receiving surface of the light receiving element has the same value as polarization dependence occurring due to the inclination of the second light transmission plate, so that even in case that a polarization state of the incident light changes, the polarization dependence occurring each other cancels out and the polarization dependence as a whole can be suppressed.

Further, by using a wedge plate as the first light transmission plate and/or the second light transmission plate, interference occurring when coherence of the incident light is high can be prevented.

Also, influence due to variations during assembly such as an angle deviation of lens holding parts used in the light receiving module or an inclination angle deviation in adjusting the optical axis can be eliminated and the polarization dependence can fully be canceled.

What is claimed is:

1. A light receiving module with reduced polarization dependence comprising:
    a first lens;
    a second lens;
    a first light transmission plate disposed between the first lens and the second lens;
    a second light transmission plate disposed between the first lens and the first light transmission plate; and
    a light receiving element having a light receiving surface, the light receiving element disposed adjacent to the first light transmission plate with the second lens sandwiched;
    wherein the light receiving element is disposed so that the light receiving surface is not perpendicular to an optical axis of an incident light beam;
    the first optical transmission plate is disposed so that a polarization dependence of the first optical transmission plate is equal to a polarization dependence of the light receiving surface, and the first optical transmission plate is rotated by 90° with respect to the optical axis; and
    the second optical transmission plate is disposed so that the sum of a polarization dependence of the second optical transmission plate and the polarization dependence of the first transmission plate is equal to the polarization dependence of the light receiving surface to cancel out the remaining polarization dependence, and the second optical transmission plate is rotated by 90° with respect to the optical axis.

2. The light receiving module with reduced polarization dependence according to claim 1, wherein at least one of the first light transmission plate and the second light transmission plate is a parallel plane plate.

3. The light receiving module with reduced polarization dependence according to claim 1, wherein at least one of the first light transmission plate and the second light transmission plate is a wedge plate.

4. A light receiving method with reduced polarization dependence, comprising the steps of:
    disposing a first lens;
    disposing a second lens;
    disposing a first light transmission plate between the first lens and the second lens;
    disposing a second light transmission plate between the first lens and the first light transmission plate;
    disposing a light receiving element having a light receiving surface, adjacent to the first light transmission plate with the second lens sandwiched so that the light receiving surface is not perpendicular to an optical axis of an incident light beam;
    inclining the first optical transmission plate so that a polarization dependence of the first optical transmission plate is equal to a polarization dependence of the light receiving surface;
    rotating the first optical transmission plate by 90° with respect to the optical axis;
    inclining the second optical transmission plate so that the sum of a polarization dependence of the second optical transmission plate and the polarization dependence of the first transmission plate is equal to the polarization dependence of the light receiving surface to cancel out the remaining polarization dependence; and rotating the second optical transmission plate by 90° with respect to the optical axis.

5. The light receiving method according to claim 4, wherein at least one of the first light transmission plate and the second light transmission plate is a parallel plane plate.

6. The light receiving method according to claim 4, wherein at least one of the first light transmission plate and the second light transmission plate is a wedge slate.

* * * * *